(12) United States Patent
Sørensen et al.

(10) Patent No.: US 11,536,252 B2
(45) Date of Patent: Dec. 27, 2022

(54) DOWN CONDUCTOR CONNECTION SYSTEM, WIND TURBINE LIGHTNING PROTECTION SYSTEM, AND METHOD FOR ARRANGING A DOWN CONDUCTOR CONNECTION SYSTEM

(71) Applicant: POLYTECH A/S, Bramming (DK)

(72) Inventors: Lennard Sørensen, Esbjerg V (DK); Richard Baker, Lichfield (GB); Mads Kirkegaard, Ribe (DK)

(73) Assignee: POLYTECH A/S, Bramming (DK)

( * ) Notice: Subject to any disclaimer, the term of this patent is extended or adjusted under 35 U.S.C. 154(b) by 0 days.

(21) Appl. No.: 17/278,950

(22) PCT Filed: Sep. 24, 2018

(86) PCT No.: PCT/IB2018/057359
§ 371 (c)(1),
(2) Date: Mar. 23, 2021

(87) PCT Pub. No.: WO2020/065368
PCT Pub. Date: Apr. 2, 2020

(65) Prior Publication Data
US 2022/0034306 A1    Feb. 3, 2022

(51) Int. Cl.
*F03D 80/30* (2016.01)
*H01R 13/28* (2006.01)
(Continued)

(52) U.S. Cl.
CPC ............ *F03D 80/30* (2016.05); *H01R 13/28* (2013.01); *H01R 13/5205* (2013.01); *H01R 13/6215* (2013.01); *F05B 2230/60* (2013.01)

(58) Field of Classification Search
CPC .... F03D 1/0675; F03D 80/30; F05B 2230/60; H01R 13/28; H01R 13/5205; H01R 13/6215
See application file for complete search history.

(56) References Cited

U.S. PATENT DOCUMENTS

2011/0142671 A1*  6/2011  Fritz ................. F03D 80/30
                                                    324/511
2012/0269631 A1   10/2012  Lewke
(Continued)

FOREIGN PATENT DOCUMENTS

CN     202 326 040     7/2012
DE     295 22 152      3/2000
(Continued)

OTHER PUBLICATIONS

International Search Report and Written Opinion of the ISA for PCT/IB2018/057359 dated May 21, 2019, 12 pages.
(Continued)

*Primary Examiner* — Sabbir Hasan
(74) *Attorney, Agent, or Firm* — Nixon & Vanderhye P.C.

(57) ABSTRACT

The present invention relates to conductor connection system for a wind turbine lightning protection system adapted to protect a wind turbine blade from lightning strikes. The lightning protection system comprises a down conductor cable adapted to extend in a longitudinal direction of the wind turbine blade and arranged for connection to the root end of the wind turbine blade, and comprises a number of lightning receptors electrically connected to and distributed along the length of the down conductor cable. The down conductor connection system comprises a modular down conductor cable having a first and second down conductor cable part, and at least one down conductor connector arranged between and connected to the ends of the down conductor cable parts. The down conductor connector comprises first and second terminals, connected to an end of each down conductor part, respectively, where the first and second terminals are adapted for mutual connection.

17 Claims, 6 Drawing Sheets

(51) Int. Cl.
    *H01R 13/52*     (2006.01)
    *H01R 13/621*     (2006.01)

(56) References Cited

U.S. PATENT DOCUMENTS

| 2016/0333861 | A1* | 11/2016 | Chacon | F03D 13/20 |
| 2018/0274521 | A1* | 9/2018 | Akhtar | F03D 80/30 |
| 2020/0271105 | A1* | 8/2020 | Sutton | F03D 1/0675 |

FOREIGN PATENT DOCUMENTS

| DE | 10 2016 116144 | | 3/2018 | | |
| EP | 2419632 B1 | | 6/2013 | | |
| EP | 3340390 A1 | * | 6/2018 | ............ | H01R 13/28 |

OTHER PUBLICATIONS

Examination Report dated Sep. 23, 2022 in Indian Application No. 202147017511, 7 pages.

Brazilian Preliminary Office Action Published in the Brazilian Industrial Property Journal No. 2700 dated Oct. 4, 2022, in connection with Brazilian Application No. BR112021004388-8, with Informal English Translation, 5 pages.

* cited by examiner

DOWN CONDUCTOR CONNECTION SYSTEM, WIND TURBINE LIGHTNING PROTECTION SYSTEM, AND METHOD FOR ARRANGING A DOWN CONDUCTOR CONNECTION SYSTEM

This application is the U.S. national phase of International Application No. PCT/IB2018/057359 filed Sep. 24, 2018, the entire contents of which are hereby incorporated by reference.

The present invention relates to a down conductor connection system for use in a wind turbine blade lightning protection system including a blade lightning down conductor adapted to extend in the longitudinal direction of a wind turbine blade, with a number of lightning receptors electrically connected to and distributed along the length of the blade lightning down conductor.

Wind turbine lightning protection systems for wind turbine blades (WTG) typically consist of an array of lightning receptors installed near the tip end of the blade, with the lighting receptors connected together and ultimately connected to the root end of the wind turbine blade by a high voltage cable, usually referred to as a down conductor. The entire lightning protection system is manufactured and delivered as one complete system, from blade tip to the blade root. This practice is adopted to ensure that the highest quality of electrical connection of the internal metallic parts and the electrical isolation of all internal metallic parts are assured. However, due to the increasing length of wind turbine blades, the introduction of modular blades and increasing manufacturing complexity, the logistics of transporting, handling and installing such physically long lightning protection systems present major challenges.

Such known protection systems are known from e.g. EP2420652A1.

The object of the present invention is to provide a practically realisable and robust down conductor connection system that will facilitate the manufacture of lighting protection systems in a modular form corresponding to the modular blades, whilst maintaining the required electrical properties of the lightning protection system. The system enables a manufacturer to arrange a modular lightning protection system that facilitates installation, and further an uninstallation of the system, or of individual parts thereof in wind turbine blades of increasing lengths.

In view of this object, the down conductor connection system is easily installed in a wind turbine blade factory without the need for specialised tools, and when the electrical connection is made, the down conductor connection system incorporates a locking mechanism which maintains its connection during the life of the lighting protection system.

The above object and advantages together with numerous other objects and advantages, which will be evident from the description of the present invention, are according to an aspect of the present invention obtained by:

A down conductor connection system for a lightning protection system adapted to protect a wind turbine blade from lightning strikes, the lightning protection system having a down conductor cable adapted to extend in a longitudinal direction of the wind turbine blade and being connected to the root end of the wind turbine blade, and a number of lightning receptors electrically connected to and distributed along the length of the down conductor cable, the down conductor connection system having a modular down conductor cable, having a first and second down conductor cable part, and at least one down conductor connector arranged between and connected to ends of said first and second down conductor cable parts, the down conductor connector having a first terminal connected to an end of a first down connector cable part, and a second terminal connected to an end of a second down conductor cable part, the first and second terminals being adapted for mutual connection, such that when being connected, the first and second down conductor cable parts at least partly define the modular down conductor cable.

Additionally, in view of this object, the addition of the connector to the lightning protection system shall not degrade the electrical isolation. The connector is installed on the down conductor cable, which is of a high voltage construction. Typically, this involves: a core conductor of copper or aluminium, a resistive polymer layer, an insulating polymer layer polymer (known as a semi-conductive layer), and a polymer outer protection jacket. The terminals are also constructed from aluminium or copper, corresponding to the core material of the cable, such that copper cables are connected to copper terminals, and aluminium cables connected to aluminium terminals.

Each down conductor cable part may comprise a number of lightning receptors, such that a plurality of connected down conductor cable parts defines the lightning protection system.

According to a further embodiment of the first aspect, the first and second terminals have a first end, connected to the end of the first and second down conductor cable parts, respectively, and a second end having a connection surface extending in a substantially longitudinal direction of the modular down conductor cable for mutual interconnection of the terminals.

The core conductors of the down conductor cable parts are preferable electrically connected respectively to the terminals by means of a hydraulic crimping process or e.g. by welding.

When the two terminals are connected and installed in the wind turbine blade, the connected interface between the two terminals is required to handle high impulse currents consistent with a lightning strike. In accordance with the WTG certification standard "IEC 61400-24", all threat carrying interfaces shall be tested and certified in accordance with the methods and test levels defined in this standard. The connector according to the present invention fulfils the requirements of "IEC 61400-24" and ensures that the connection is capable of full functionality without maintenance or repair for the service life of the wind turbine blade lightning protection system.

According to a further embodiment of the first aspect, the first and the second terminals have releasable locking means for securing the connection surfaces in a mutual locked connection.

With the threat current capability objective in mind, the connector interface preferably comprises two copper or aluminium terminals connected together by means of releasable locking means, hereby ensuring that the interface is capable of handling the pulsed threat current with no arcing or sparking. The releasable locking means preferably comprises bolts or screw, ensuring a stable connection between the two terminals. However, the releasable locking means may alternatively comprise other suitable embodiments capable of interconnecting the two terminals. Other types of connecting means may be locking pawls or glue, or the terminals themselves may incorporate the locking means. Hereby, each terminal may be formed with a contoured surface mating a contoured surface of the opposed terminal in such a way that the terminals are mutually locked for displacement.

According to a further embodiment of the first aspect, the down conductor connector comprises semi-conductive layers, each being arranged around the first end of the terminals and the ends of the first and second down conductor cable parts, respectively, hereby partly enclosing the first and second terminals and any uninsulated end part of the down conductor cable parts.

The semi-conductive layer ensures a smooth transition from the semi conductive layer of the insulated down conductor cable to the connector terminals. In a preferred embodiment, the semi conductive layer is injection-moulded onto the ends of the down conductor cable parts and the terminals; however, the semi-conductive layer may alternatively be a premanufactured insert, such as a tubular premoulded part or a semi-conductive tape wrapped around the cable ends and the terminals.

According to a further embodiment of the first aspect, the down conductor connector comprises insulation layers, each being arranged around and enclosing each of the semi-conductive layers, such that the connection between the terminals and the down conductor cable parts is insulated.

The interface between the cable, crimp terminal and connector body is preferably electrically isolated by means of the insulation layer, which is preferable a high dielectric polymer. This interface also provides mechanical strength and strain isolation to the connector and cable interface. In a preferred embodiment, the insulation layer does not enclose a part of the semi-conductive layer towards the second end of the terminals, hereby leaving this part uninsulated.

The system is preferable constructed with the above mentioned semi-conductive layers and the above mentioned insulation layers, each being arranged around and fully enclosing each of the semi-conductive layers. However, in another possible embodiment, the down conductor connecter only comprises the insulation layers and not the first mentioned semi-conductive layers.

According to a further embodiment of the first aspect, the down conductor connector comprises a pre-manufactured semi-conductive insert, which is arranged around the interconnected terminals between the semi-conductive layers.

The protection provided by the semi-conductive layers of the down conductor is across the down conductor connecter maintained by means of the pre-manufactured semi-conductive insert of the internal face of the insulated material of the connector being in contact with the semi conductive material of the cable.

The insert is preferably made of a semi-conductive polymer. This continuity is maintained between the two separate down conductor cable parts when the terminals are interconnected and the pre-manufactured semi-conductive insert is arranged around the interconnected terminals. The terminals of the down conductor connector are hereby electrically connected.

When the connection is made and the pre-manufactured semi-conductive insert is arranged over the terminals, the electrical insulation layer is completely maintained across the connector and connected to the corresponding cables, and the pre-manufactured semi-conductive insert acts as a corona reduction layer.

A corona discharge is an electrical discharge brought on by the ionization of a fluid such as air surrounding a conductor that is electrically charged. Spontaneous corona discharges occur naturally in high-voltage systems unless care is taken to limit the electric field strength.

In a preferred embodiment, the pre-manufactured semi-conductive insert is constructed as a tubular insert having a longitudinal slit, enabling the insert to be wrapped around the interconnected terminals. In another possible embodiment, the insert comprises a semi-conductive tape being wrapped around and fully enclosing the interconnected terminals. In a further preferred embodiment, the pre-manufactured semi-conductive insert partly overlaps the first semi-conductive layers. This overlap enhances the electrical insulation of the terminals and minimizes corona discharge.

According to a further embodiment of the first aspect, the down conductor connector comprises:
  a first outer protective insulation cover, connected to and surrounding the first down conductor cable part, the first outer protective insulation cover being arranged for at least partly enclosing the premanufactured semi-conductive insert;
  a second outer protective insulation cover, connected to and surrounding the second down conductor cable part, the second outer protection cover being arranged for at least partly enclosing the premanufactured semi-conductive insert and mating the first outer protective insulation cover.

The electrical insulation of the internal metallic parts, the terminals, and the cable core, is further enhanced by incorporating the outer protective insulation covers, which preferable comprise a high dielectric material, such as a dielectric polymer. The mating of the first and second outer protective insulation covers ensures the protective enclosure and electrical insulation of the terminals.

According to a further embodiment of the first aspect, the second outer protective insulation cover partly overlaps the first outer protection insulation cover,
  the first and second outer protection insulation covers having mutual locking means, arranged for interlocking the outer protection covers, hereby fully enclosing the terminals and the premanufactured semi-conductive insert.

The electrical isolation of all internal metallic parts is even further enhanced by incorporating the outer protective insulation covers with an overlap and incorporated locking means for mutually interlocking the outer protective insulation covers.

This overlap and interconnection results in the down conductor connector having a dielectric strength equal to or greater than the down conductor cable itself.

According to a further embodiment of the first aspect, the outer surface of the insulating layers comprises a stepped contour corresponding to an internal stepped contour of the outer protective covers, such that a movement of the outer protective covers on each down conductor cable parts is limited in a direction of the terminals.

Arranging the outer protective insulation covers with an internal stepped contour mating and outer stepped contour of the insulation layer limits the movement of the outer protective insulation covers in a longitudinal direction of the down conductor cable parts in a direction towards the terminals, which enhances the locking and electrical insulation of the outer protective insulation covers.

According to a further embodiment of the first aspect, the connection system comprises a slideable end seal, such as a sealing ring, for arranging the outer protective covers in water tight connection with the cable parts, the end seal being arranged on each of the ends of the down conductor cable parts and disposed between the cables and the first and second outer protection covers, respectively.

The down conductor connection system preferably incorporates integrated environmental end seals to prevent moisture and contaminant ingress at the cable interface and the two the interconnected terminals.

According to a further embodiment of the first aspect, the connection system comprises a clamping element for securing the connection system against the wind turbine blade,
the clamping element having a bonding surface for bonding against a part of a said wind turbine blade, and a number of clamping elements for at least partly enclosing the outer protective covers and clamping the connection system against the wind turbine blade.

The down conductor connection system incorporates a separate clamping system which may be bonded with an adhesive or other suitable connection means to the wind turbine blade structure. The clamp incorporates a locking feature by the clamping elements which holds the down conductor connection system in position during the life of the lighting protection system. Thereby, these features offer significant advantage to the wind turbine manufacturer in terms of quick and reliable installation of the lightning protection system. In a further alternative embodiment, the clamp may be integrated into one or both of the outer protection insulation covers.

According to a second aspect of the present invention, the above objects and advantages are obtained by:
A lightning protection system adapted to protect a wind turbine blade from lightning strikes, the protection system including a down conductor cable adapted to extend in the longitudinal direction of the wind turbine blade and being connected to the root end of the wind turbine blade, the lightning protection system having a number of lightning receptors electrically connected to and distributed along the length of the down conductor cable, wherein the down conductor cable is a modular down conductor cable having a down conductor connection system.

According to a further embodiment of the second aspect, the lightning protection system comprises a plurality of the down conductor connection systems.

In order to arrange the lightning protection system in a variety of lengths of wind turbine blades in a quick and reliable manner, the system may comprise any suitable number of down conductor connectors, hereby connecting a plurality of modules of the lightning protection system.

According to a third aspect of the present invention, the above objects and advantages are obtained by:
A method for arranging a down conductor connection system comprising the following steps:
providing a number of terminals,
providing a number of down conductor cable parts,
connecting a first end of the terminals to an end of the down conductor cable parts, respectively,
arranging a semi-conductive layer around the first end of the terminals and the end of the cable parts, respectively,
arranging the number of down conductor cable parts, each having a terminal, inside the wind turbine blade in a longitudinal direction thereof, and
interconnecting at least two adjacent cable parts by connecting second ends of the terminals.

According to a further embodiment of the third aspect, the method further comprises:

arranging an insulation layer around the semi-conductive layers, such that the connection between the terminals and the down conductor cable parts is insulated.

According to a further embodiment of the third aspect, the method further comprises:
arranging a premanufactured semi-conductive insert around the connected terminals, between the semi-conductive layers or the insulation layers.

According to a further embodiment of the third aspect the method further comprises:
arranging the first and second outer protective insulation covers on adjacent cable parts, interlocking the first and second outer protection insulation covers by mutual locking, hereby enclosing the terminals.

According to a further embodiment of the third aspect the method further comprises:
providing a clamp for bonding to a part of said wind turbine blade, and clamping said connection system to said clamp The down conductor connection system may in an alternative embodiment be connected internally to the wind turbine blade, by the use of other suitable fixing members. The system may be incorporated internally in the blade by use of e.g. suitable brackets, or part of the down conductor cable parts may be laminated onto an inner part of the blade.

The complete connector is hereby mounted into the wind turbine blade. This system yields the possibility of the lightning protection system incorporating any number of connections as required by the specific installation requirements.

The invention will now be explained in more detail below by means of examples of embodiments with reference to the very schematic drawing, in which:

FIG. 1 shows a perspective view of the down conductor connection system.

FIG. 2A—2D show perspective views of the down conductor connection system in partly assembled states.

Figure 1:
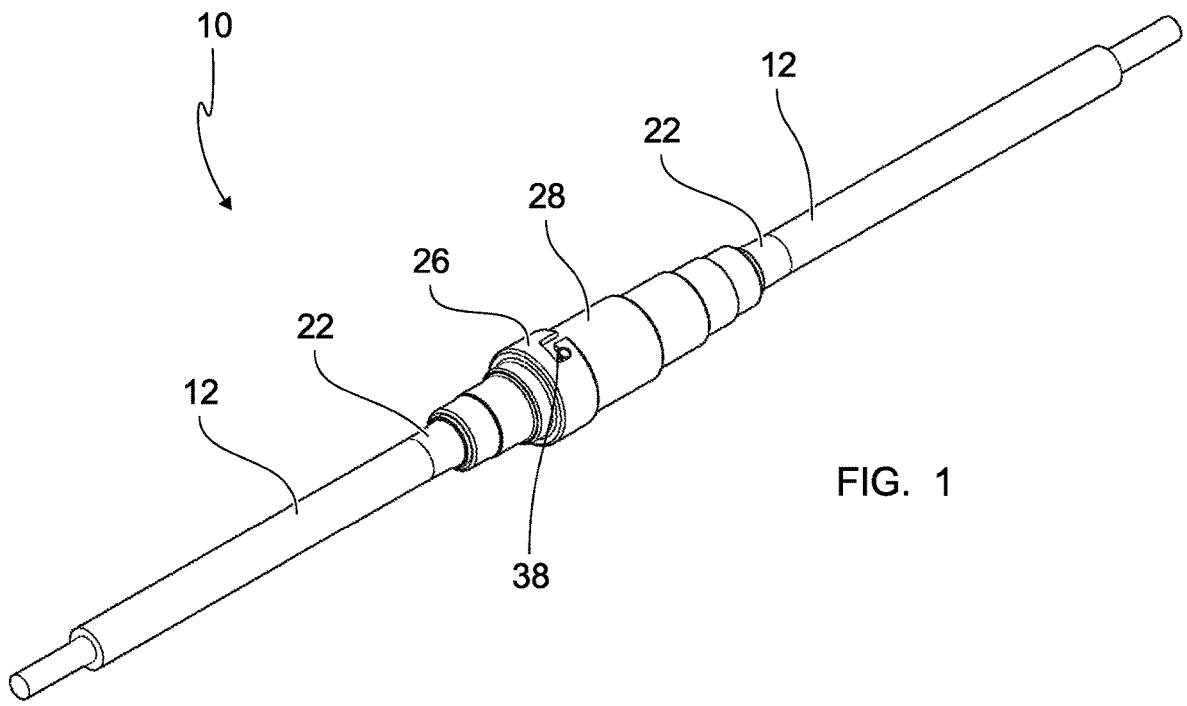

The present invention wilt now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will, thus, not be described in detail with respect to the description of each figure.

FIG. 1 shows a perspective view of the down conductor connection system 10. The down conductor connection system 10 is illustrated fully assembled, though without illustrating the clamp. The illustrated down conductor connection system 10 comprises two down conductor cable parts 12 being mutual interconnected at one end, and being illustrated with an opposite free end, which in the illustrated embodiment is uninsulated. The uninsulated end parts 30

(not shown) of the down conductor cable parts 12 are arranged for being connected to another opposed down conductor cable part via another down conductor connection system 10 or suitable for being connected to a lightning receptor.

The down conductor cables 12 are shown interconnected via the first and second outer protective insulation covers 26, 28, fully enclosing the internal interconnected terminals 14 (not shown). Further, insulation layers 22 are shown extending from an inside of the connection system to and outside, and partly overlapping an outer surface of the down conductor cable parts. In a preferred alternative embodiment, the first and second outer protective insulation covers 26, 28 also enclose the ends of the insulation layers. The connection between the first and second outer protective insulation covers 26, 28 is in the figure established by an integrated locking mechanism 38 illustrated as a bayonet lock. The outer protective insulation covers 26, 28 may alternatively be fabricated without the integrated locking mechanism 38, and thus, the mutual interconnection between the two protective insulation covers 26, 28 may be accomplished by other suitable locking means, such as a screw mechanism, an external mechanical locking element, or a semi-conductive tape wrapped around the abutting outer protective insulation covers 26, 28.

FIGS. 2A-2D show perspective views of the down conductor connection system 10 in partly assembled states. The figures illustrate parts of the down conductor connection system 10 before the down conductor parts 12 are interconnected.

Figure 2A:
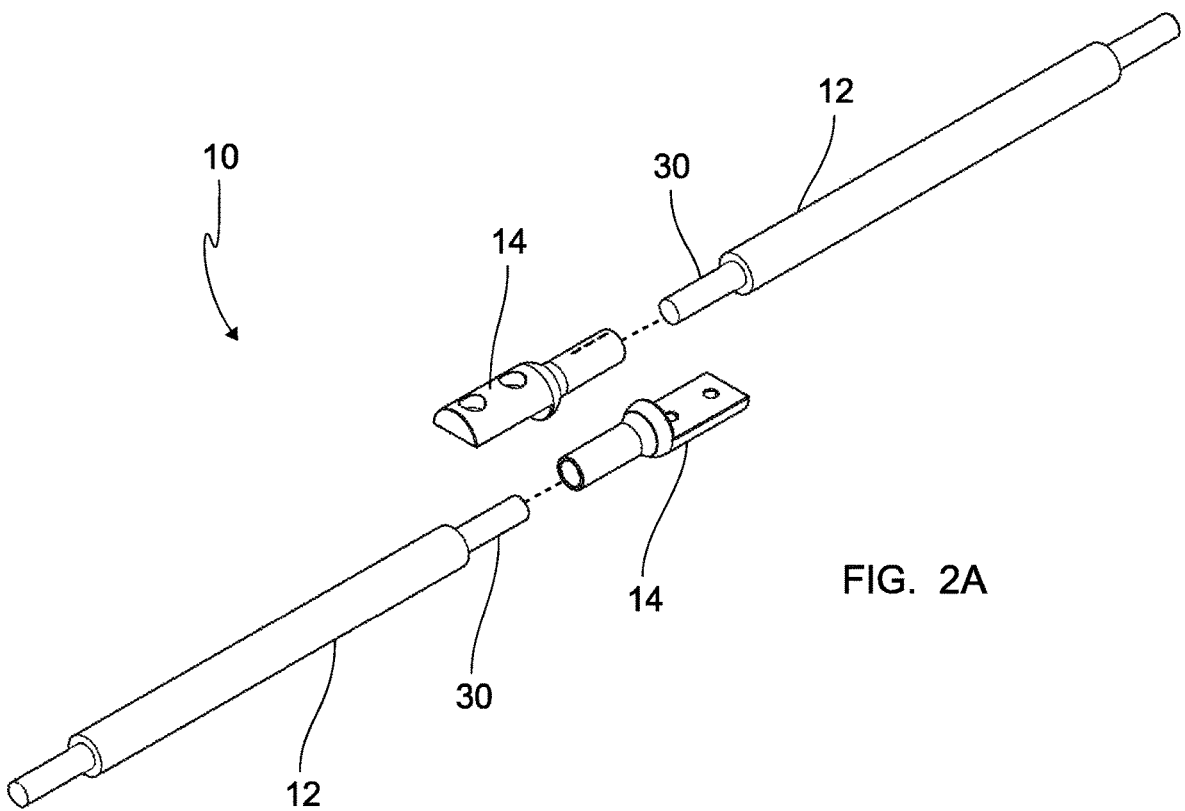

FIG. 2A illustrates the connection of the terminals 14 on uninsulated end parts 30 of the down conductor cable parts 12. Each terminal 14 comprises a first end for connection to the opposed terminal 14, and a second end comprising a opening for receiving the uninsulated end part 30 of the down conductor cable part 12. The ends of the down conductor parts are preferable connected to the open ends of the terminals 14 by crimping process or e.g. by welding.

Figure 2B:
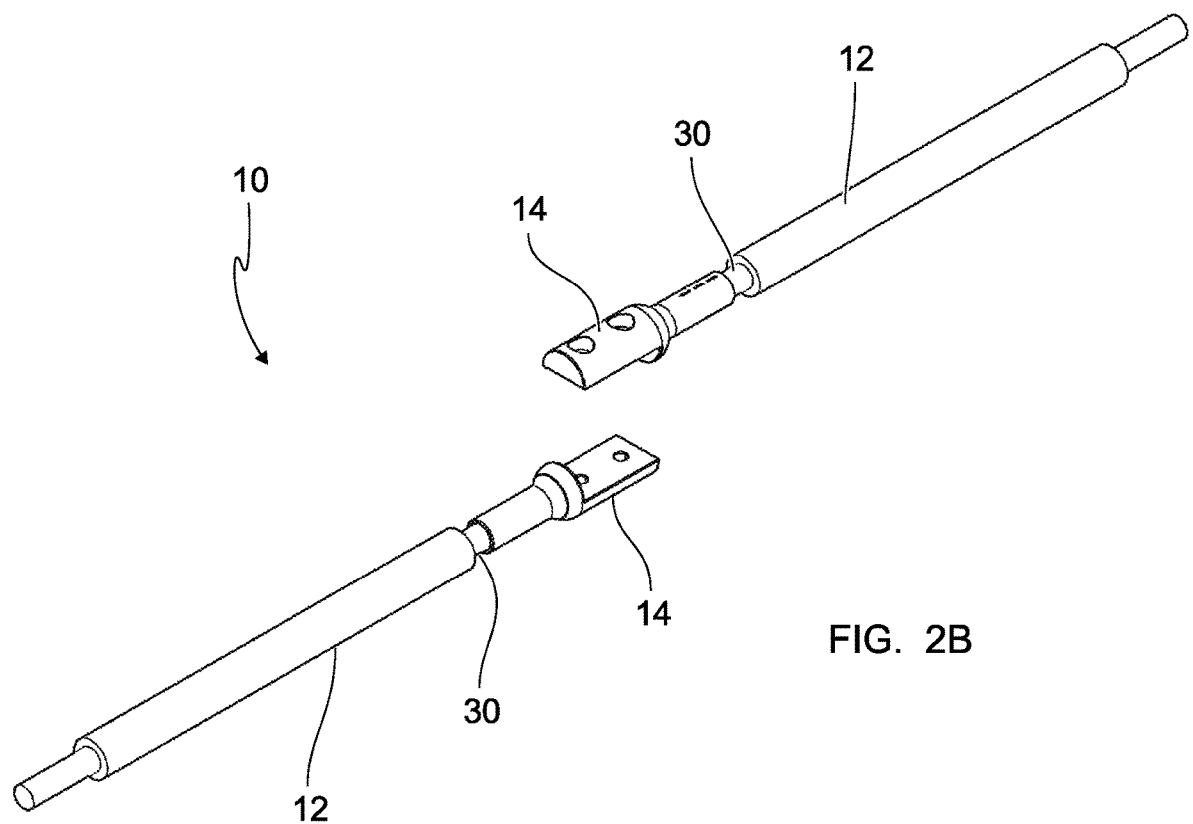

FIG. 2B illustrates the terminals 14 being arranged on ends of the down conductor cable parts 12, and illustrates a remaining part of the uninsulated end part 30 still exposed between the terminals 14 and the insulated cable part 12. This exposed uninsulated end part 30 may vary according to production tolerances, however, as little as possible of the remaining exposed uninsulated end part 30 is requested.

Figure 2C:
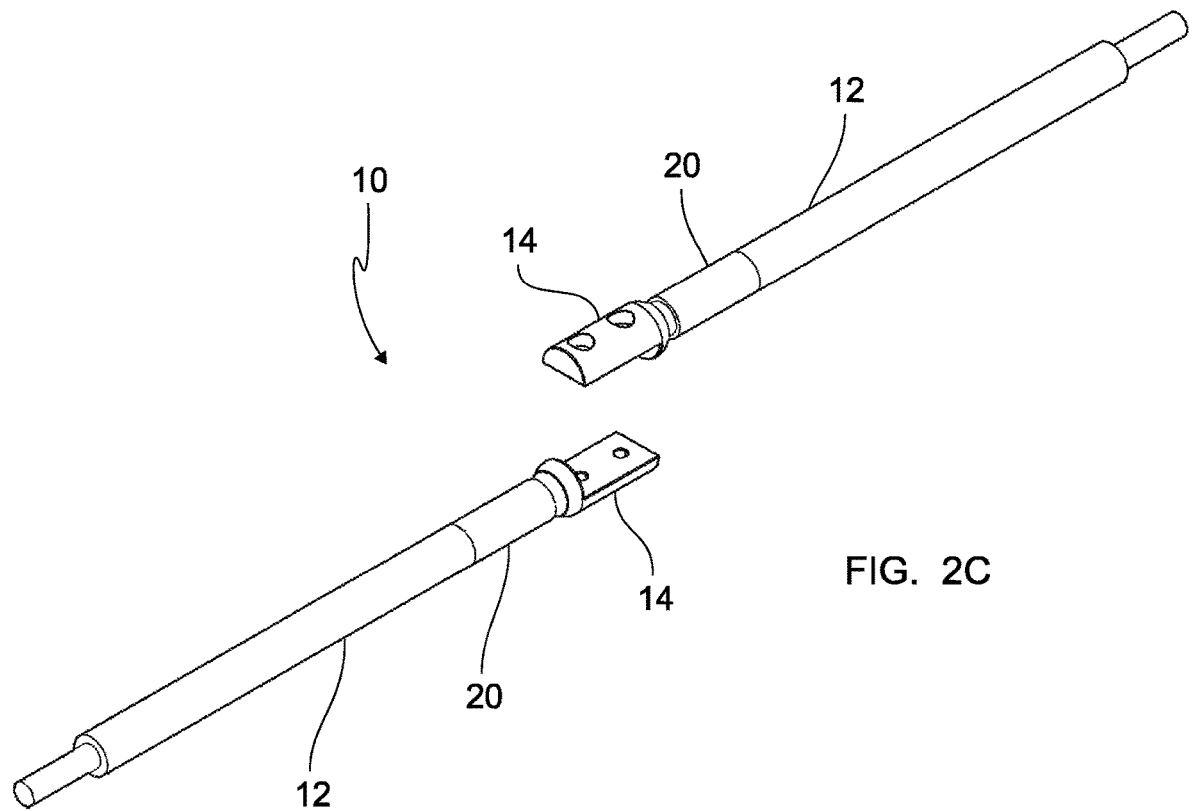

FIG. 2C illustrates the semi-conductive layers 20 being arranged over the transition regions of the insulated down conductor cable parts 12 and the terminals 14. The semi-conductive layers 20 partly overlap the terminals 14, fully cover any exposed uninsulated end part 30, and preferable overlaps a part of the insulated down conductor cable parts 12 as well. In a basis embodiment, the semi-conductive layers 20 do not overlap the insulated cable parts 12, but only span the uninsulated cable parts 30, and partly the terminals 14.

Figure 2D:
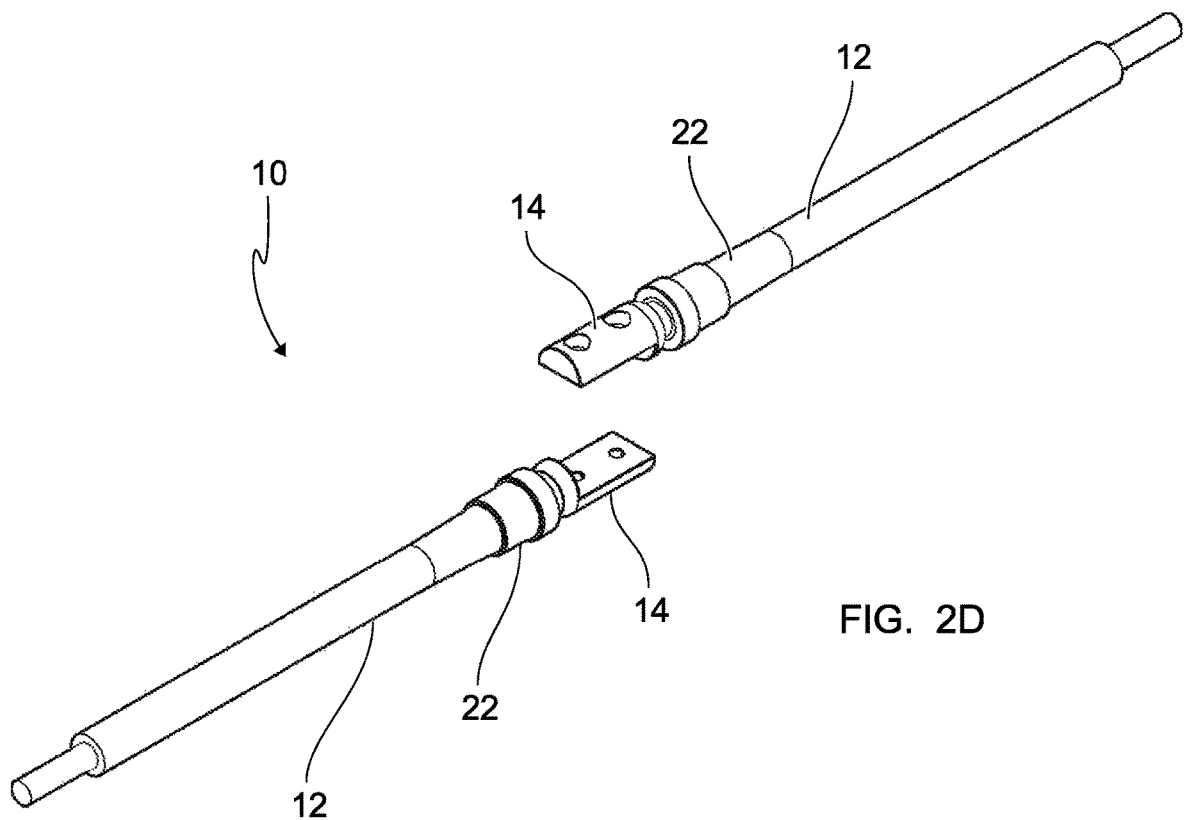

FIG. 2D illustrates the additional insulation layers 22 arranged on top of, and enclosing the semi-conductive layers 20. Alternatively, the insulation layers 22 only partly enclose the semi-conductive layers 20. The insulation layers 22 preferably overlap part of the insulated down conductor cable part 12, hereby arranging the transition between the down conductor cable parts 12 end the terminals 14 in enhanced electrical insulation.

Figure 3A:
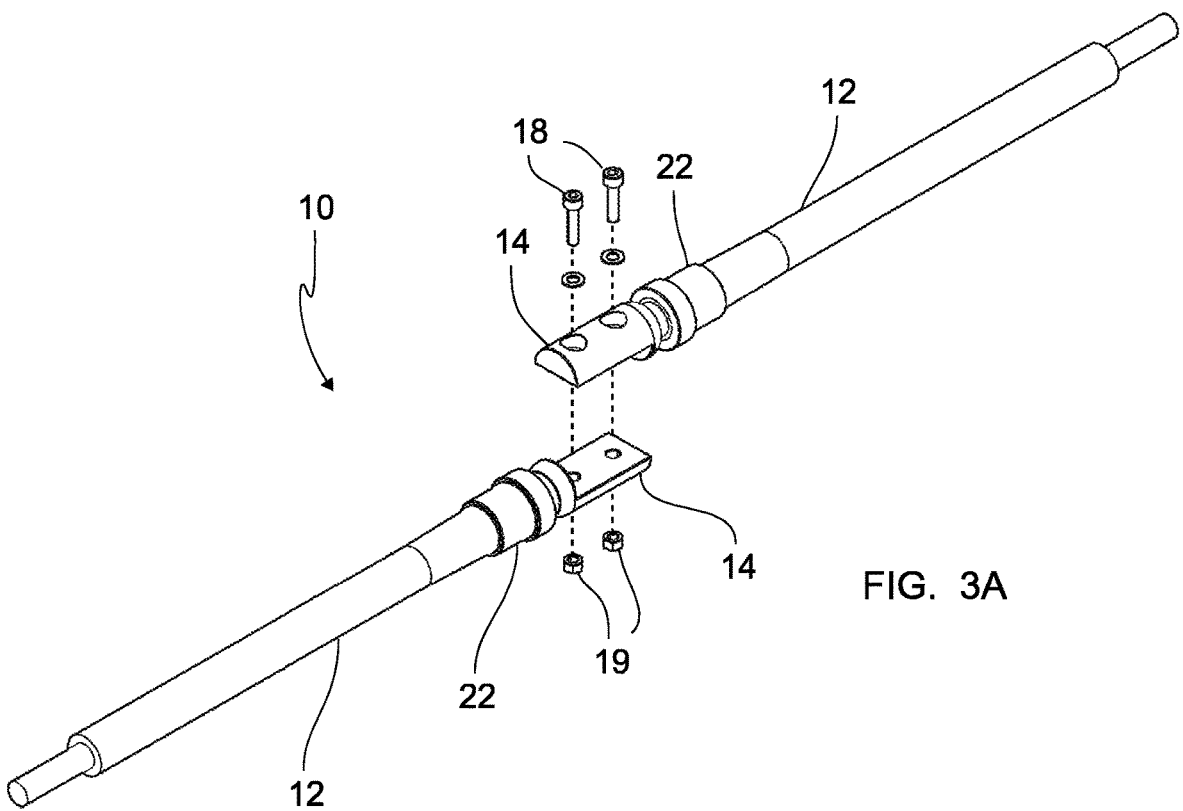
FIG. 3A-3B show perspective views of the down conductor connection system being assembled.
Figure 3B:
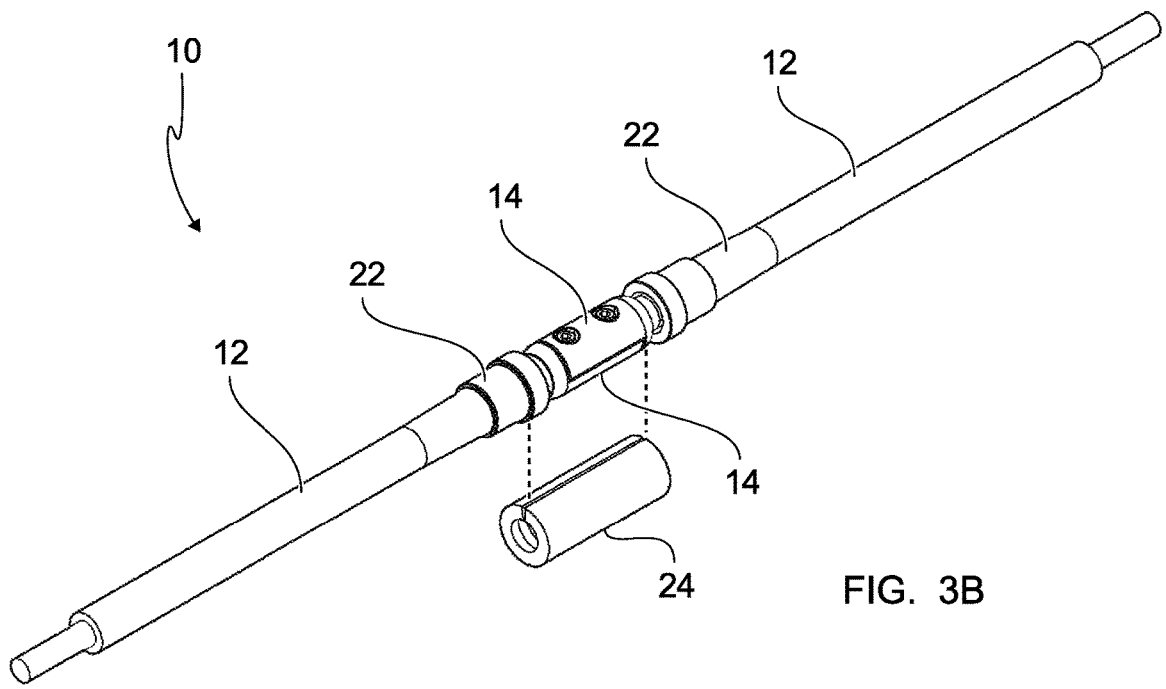

FIGS. 3A-3B show perspective views of the down conductor connection system being assembled.

FIG. 3A illustrates a possible connection between the two opposed terminals 14. Each of the terminals 14 may comprise a number of apertures (shown as two apertures), where each aperture aligns with a corresponding aperture of the opposed terminal 14, such that when the two terminals 14 are correctly arranged in relation to each other, locking means 18, 19, such as bolts 18, may arranged through the apertures and secured in place by a cooperating nut 19. The illustrated embodiment of the locking elements 18, 19 being bolts 18 and nuts 19 just illustrates only one of several possible embodiments of interconnecting the two terminals. Other suitable embodiments include screws, locking pawls, glue, or a further alternative embodiment where the connecting surfaces of each terminal 14 comprise projecting elements that interlock with the projecting element of the opposed terminal 14.

FIG. 3B illustrates the two terminals 14 being connected, and illustrates the pre-manufactured semi-conductive insert 24 being ready for insertion around the connected terminals 14. The pre-manufactured semi-conductive insert 24 is illustrated as a tubular element having a through-going longitudinal slit, such that the pre-manufactured semi-conductive insert 24 may be wrapped around the interconnected terminals 14.

Figure 4:
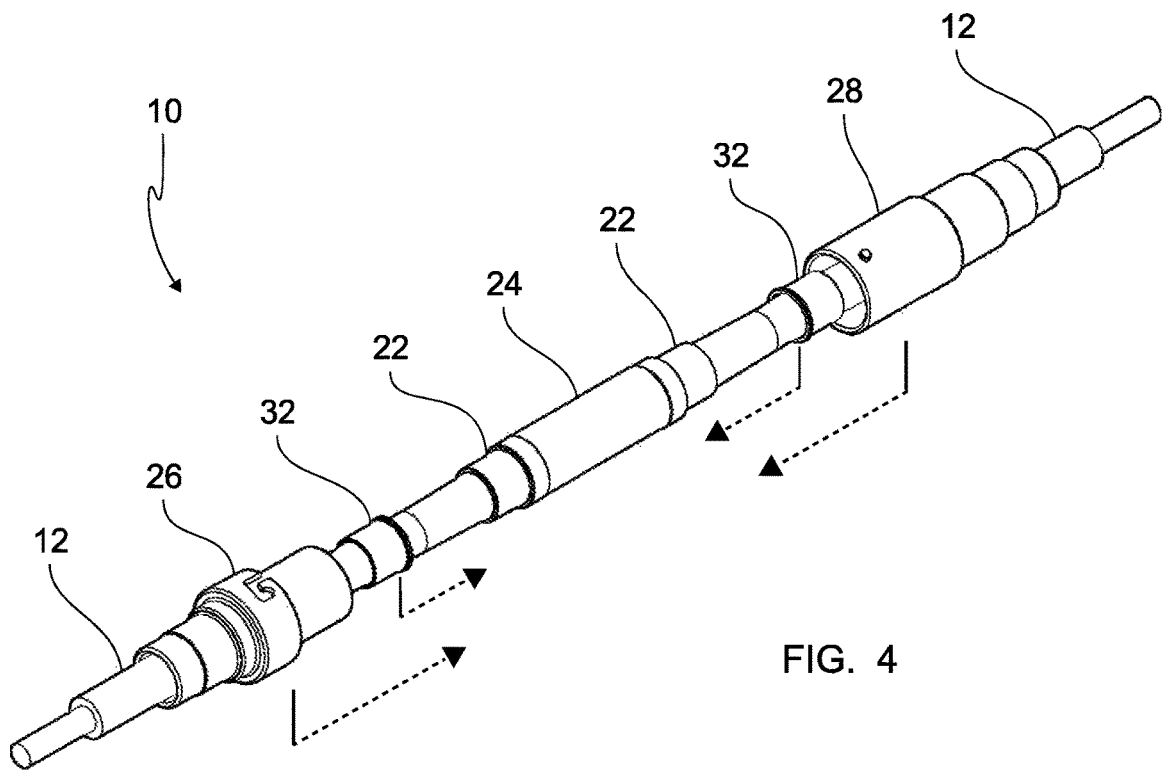
FIG. 4 shows a perspective view of the assembling of the outer protective insulation covers.

FIG. 4 shows a perspective view of the assembling of the outer protective insulation covers 26, 28.

The figure illustrates a possible final step in interconnecting the opposed down conductor cable parts 12. The pre-manufactured semi-conductive insert 24 is shown arranged over the interconnected terminals 14 (not shown). An end seal 32 and a first or second outer protection insulation cover are arranged on each side of the pre-manufactured semi-conductive insert 24. In the illustrated embodiment, each end seal 32 is moved into abutment with the stepped contour of the insulation layer 22, and the first and second outer protective insulation covers 26, 28 are moved into mutual interlocked connection, whereby the pre-manufactured semi-conductive insert 24 is fully enclosed.

Figure 5:
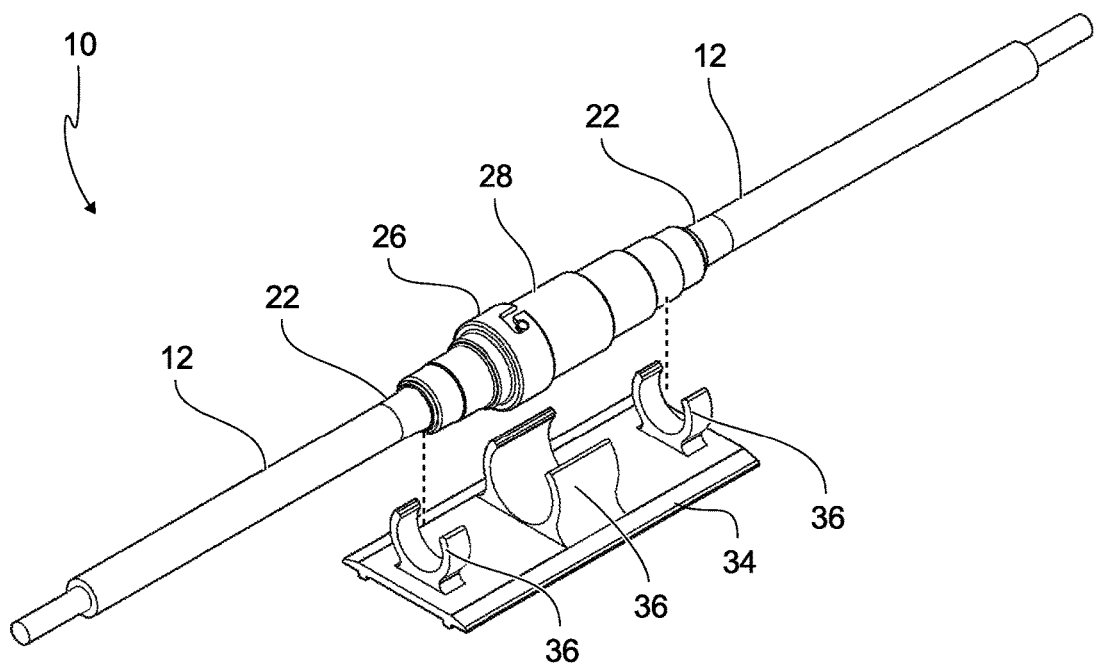
FIG. 5 shows a perspective view of the down conductor connection system.

FIG. 5 shows a perspective view of the down conductor connection system 10 being arranged in a clamp 34. The down conductor connection system 10 is illustrated in a position where the connection system 10 is being arranged in the clamp 34. The clamp 34 is in this embodiment arranged with a flat base portion for connecting to an inner part of the wind turbine blade via suitable connection means. The base portion comprises a number of projecting elements 36 for clamping around portions of the first and second outer protection insulation covers 26, 28. The clamp 34 may comprise a suitable number of clamping elements 36 for clamping the protective insulation covers 26, 28 and/or the down conductor cable parts 12. Alternatively, the clamp 34 may be integrated with one of the protective insulation covers.

Figure 6:
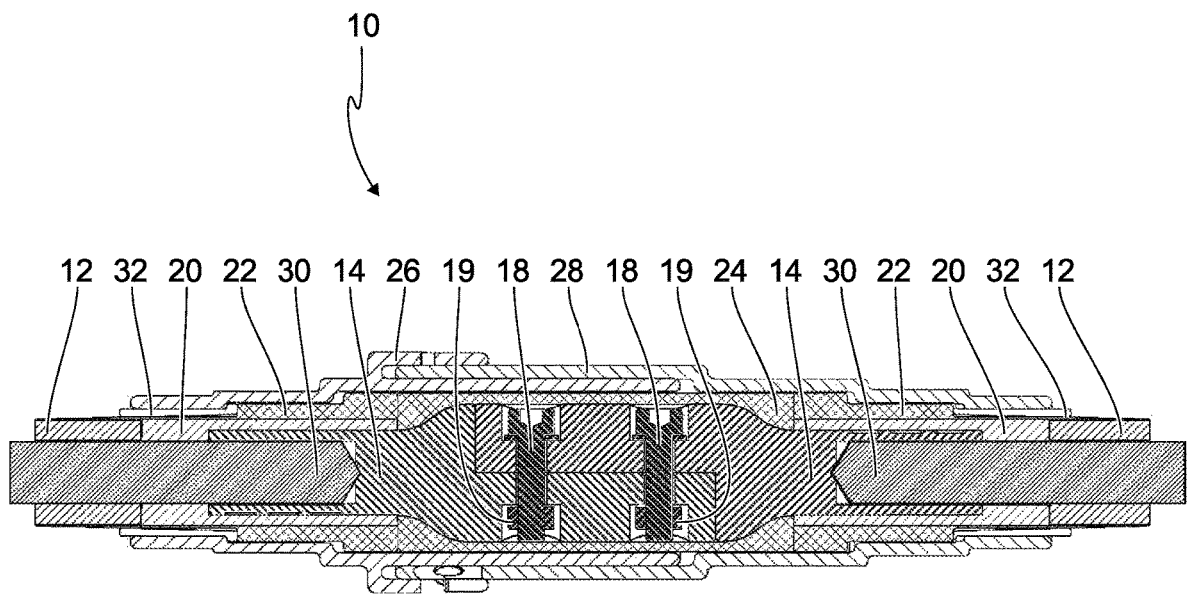
FIG. 6 shows a cross-section of the down conductor connection system.

FIG. 6 shows a cross section of the down conductor connection system and clearly illustrates the mutual relationship between the individual elements. The illustration is just a basic, possible embodiment, and thus the arrangement of the individual parts may vary.

Figure 7:
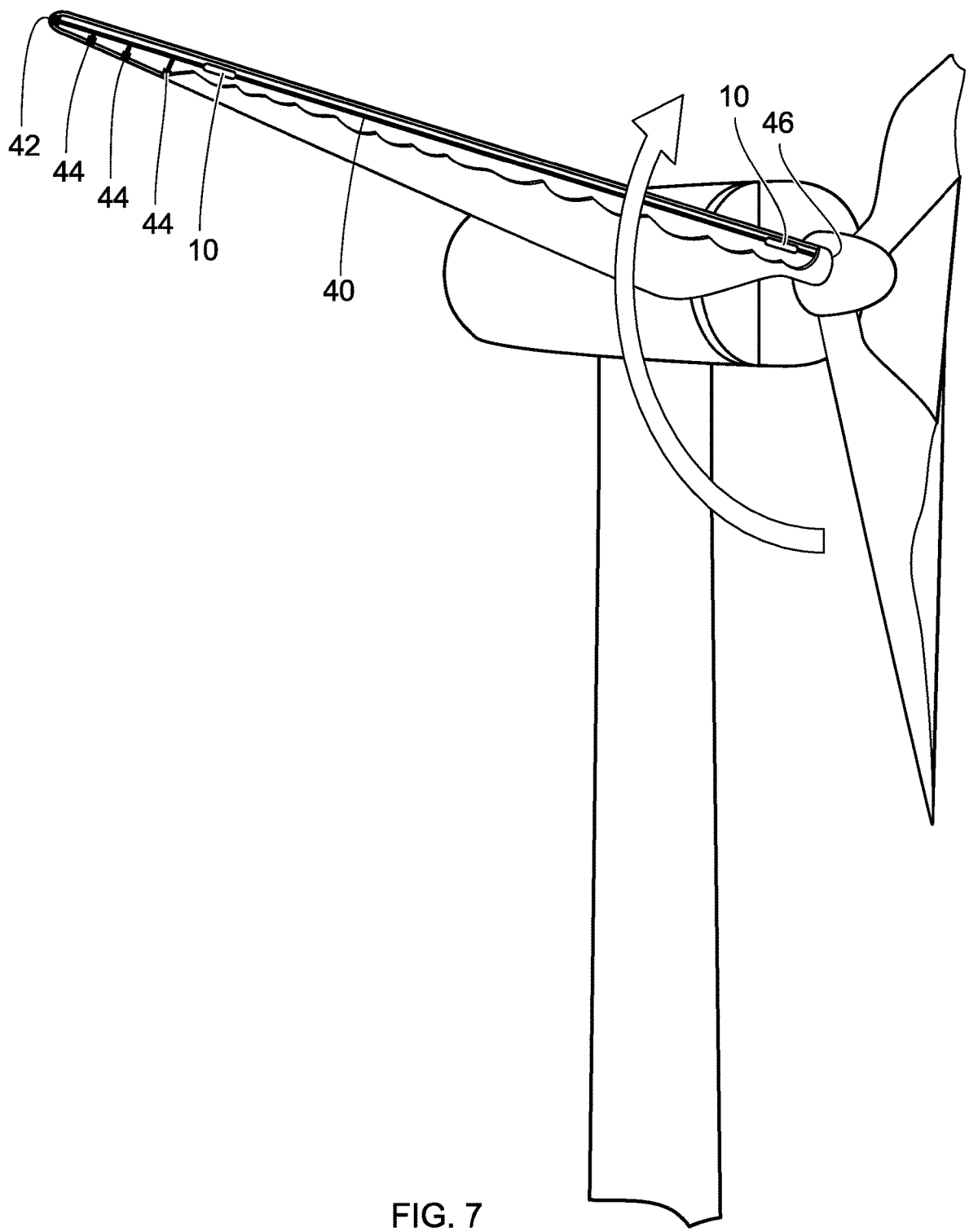
FIG. 7 shows a perspective of a wind turbine blade having a lightning protection system comprising a down conductor connection system.

FIG. 7 shows a perspective view of a wind turbine with a wind turbine blade having a lightning protection system comprising a down conductor connection system. The figure is a schematic illustration of a possible embodiment of a wind turbine blade having a down conductor 40 extending in the longitudinal direction of the wind turbine blade from the tip end to the root end 46. The lightning protection system comprises a tip receptor 42 arranged at an end of the down conductor 40, and a number of side receptors 44 electrically connected to and distributed along the length of the down conductor 40. The embodiment shown in the figure illustrates the lightning protection system having two down conductor connection systems 10; however, any further number, or just one connection system 10 may be employed into the lightning protection system.

In the following is given a list of reference signs that are used in the detailed description of the invention and the drawings referred to in the detailed description of the invention.
10. Down conductor connection system
12. Down conductor cable parts
14. Terminals
16. Connection surface
18. Locking means
19. Locking means
20. Semi-conductive layer
22. Insulation layer
24. Pre-manufactured semi-conductive insert
26. First outer protective insulation cover
28. Second outer protective insulation cover
30. Uninsulated cable part end
32. End seal
34. Clamp
36. Clamping elements
38. Outer protection insulation cover lock
40. Down conductor
42. Tip receptor
44. Side receptor
46. Blade root

The invention claimed is:

1. A down conductor connection system for a lightning protection system adapted to protect a wind turbine blade from lightning strikes, said lightning protection system having a down conductor cable adapted to extend in a longitudinal direction of said wind turbine blade and being connected to a root end of said wind turbine blade, and a number of lightning receptors electrically connected to and distributed along the length of said down conductor cable,
wherein the down conductor cable is modular and having a first and second down conductor cable part, and at least one down conductor connector arranged between and connected to ends of said first and second down conductor cable parts,
said at least one down conductor connector having a first terminal connected to an end of the first down connector cable part, and a second terminal connected to an end of the second down conductor cable part,
said first and second terminals being adapted for mutual connection, such that when being connected, said first and second down conductor cable parts at least partly define said modular down conductor cable, and
wherein said at least one down conductor connector comprises semi-conductive layers, each being arranged around a respective first end of said first and second terminals and said ends of said first and second down conductor cable parts, respectively, thereby partly enclosing said first and second terminals and any uninsulated end part of said first and second down conductor cable parts.

2. The down conductor connection system according to claim 1, wherein said first and second terminals each have a second end having a connection surface extending in a substantially longitudinal direction of said modular down conductor cable for mutual interconnection of said first and second terminals.

3. The down conductor connection system according to claim 2, wherein said first and said second terminals have releasable locking means for securing said connection surfaces in a mutual locked connection.

4. The down conductor connection system according to claim 1, wherein said down conductor connector comprises insulation layers, each being arranged around and enclosing each of said semi-conductive layers, such that said connection between said first and second terminals, and said first and second down conductor cable parts is insulated.

5. A method for arranging the down conductor connection system according to claim 4, in the lightning protection system comprising:
providing a number of the first and second terminals,
providing a number of the first and second down conductor cable parts,
connecting the first end of said first and second terminals to the end of said first and second down conductor cable parts, respectively,
arranging the semi-conductive layer around said first end of said first and second terminals and said end of said first and second down conductor cable parts, respectively,
arranging said number of the first and second down conductor cable parts, each having a respective first and second terminal, inside said wind turbine blade in the longitudinal direction thereof, and
interconnecting at least two adjacent first and second down conductor cable parts by connecting the second ends of said first and second terminals.

6. The method according to claim 5, further comprising:
arranging the insulation layers around each of said semi-conductive layers, such that said connection between said first and second terminals and said first and second down conductor cable parts is insulated.

7. The method according to claim 5, further comprising:
arranging a premanufactured semi-conductive insert around said connected first and second terminals, between said semi-conductive layers or said insulation layers.

8. The method according to claim 5, further comprising:
arranging first and second outer protective insulation covers on adjacent first and second down conductor cable parts, interlocking said first and second outer protection insulation covers by mutual locking, hereby enclosing said first and second terminals.

9. The method according to claim 8, further providing the clamp according to claim 8 for bonding to a part of said wind turbine blade and clamping said connection system to said clamp.

10. The down conductor connection system according to claim 1, wherein said down conductor connector comprises a pre-manufactured semi-conductive insert, which is arranged around said interconnected first and second terminals, between said semi-conductive layers.

11. The down conductor connection system according to claim 10, wherein said down conductor connector comprises:
a first outer protective insulation cover, connected to and surrounding said first down conductor cable part, said first outer protective insulation cover being arranged for at least partly enclosing said premanufactured semi-conductive insert;
a second outer protective insulation cover, connected to and surrounding said second down conductor cable part, said second outer protection cover being arranged for at least partly enclosing said premanufactured semi-conductive insert and mating said first outer protective insulation cover.

12. The down conductor connection system according to claim 11, wherein said second outer protective insulation cover partly overlaps said first outer protection insulation cover, said first and second outer protection insulation covers having mutual locking means, arranged for interlocking said outer protection covers, hereby fully enclosing said first and second terminals and said premanufactured semi-conductive insert.

13. The down conductor connection system according to claim 11, further comprising insulating layers, wherein an outer surface of said insulating layers comprises a stepped contour corresponding to an internal stepped contour of said first and second outer protective covers, such that a movement of said first and second outer protective covers on each down conductor cable part is limited in a direction of said connector parts.

14. The down conductor connection system according to claim 11, wherein said connection system has a slideable end seal, such as a sealing ring, for arranging said first and second outer protective covers in water tight connection with said first and second down conductor cable parts, said end seal being arranged on each of said ends of said first and second down conductor cable parts and disposed between said first and second down conductor cable parts and said first and second outer protection covers, respectively.

15. The down conductor connection system according to claim 11, wherein said connection system comprises a clamp for securing said connection system against said wind turbine blade, said clamping element having a bonding surface for bonding against a part of a said wind turbine blade, and a number of clamping elements for at least partly enclosing said first and second outer protective covers and clamping said connection system against said wind turbine blade.

16. A lightning protection system adapted to protect the wind turbine blade from said lightning strikes, wherein said lightning protection system comprises the down conductor connection system according to claim 15.

17. The lightning protection system according to claim 16, further comprising a plurality of said conductor connection systems.

* * * * *